United States Patent
Illg et al.

(10) Patent No.: US 9,137,227 B2
(45) Date of Patent: Sep. 15, 2015

(54) MATCHING ENTITLEMENT INFORMATION FOR MULTIPLE SOURCES

(75) Inventors: Jason J. Illg, Rochester, MN (US); Sean Murray, Marietta, GA (US); John M. Pisello, Rutledge, GA (US)

(73) Assignee: International Business Machines Corporation, Armonk, NY (US)

( * ) Notice: Subject to any disclaimer, the term of this patent is extended or adjusted under 35 U.S.C. 154(b) by 3147 days.

(21) Appl. No.: 11/211,005

(22) Filed: Aug. 24, 2005

(65) Prior Publication Data

US 2007/0056044 A1    Mar. 8, 2007

(51) Int. Cl.
G06F 15/16    (2006.01)
G06F 15/173   (2006.01)
H04L 29/06    (2006.01)

(52) U.S. Cl.
CPC ............ *H04L 63/08* (2013.01); *H04L 63/0884* (2013.01)

(58) Field of Classification Search
USPC .................................................. 709/229, 226
See application file for complete search history.

(56) References Cited

U.S. PATENT DOCUMENTS

| | | | |
|---|---|---|---|
| 5,341,477 A * | 8/1994 | Pitkin et al. ................ | 709/226 |
| 5,696,898 A | 12/1997 | Baker et al. | |
| 5,889,952 A * | 3/1999 | Hunnicutt et al. ............ | 709/219 |
| 5,999,978 A | 12/1999 | Angal et al. | |
| 6,012,067 A | 1/2000 | Sarkar | |
| 6,105,027 A * | 8/2000 | Schneider et al. ................ | 707/9 |
| 6,154,741 A | 11/2000 | Feldman | |
| 6,202,066 B1 * | 3/2001 | Barkley et al. .................... | 707/9 |
| 6,408,336 B1 | 6/2002 | Schneider et al. | |
| 6,594,661 B1 | 7/2003 | Tagg | |
| 6,654,745 B2 * | 11/2003 | Feldman ......................... | 707/9 |
| 2003/0221100 A1 * | 11/2003 | Russ et al. .................... | 713/153 |
| 2004/0093502 A1 * | 5/2004 | Shurygailo et al. ........... | 713/183 |
| 2005/0015621 A1 * | 1/2005 | Ashley et al. ................ | 713/201 |
| 2005/0249350 A1 * | 11/2005 | Kahn et al. .................... | 380/239 |
| 2006/0041436 A1 * | 2/2006 | Brodie et al. ..................... | 705/1 |
| 2006/0059155 A1 * | 3/2006 | Illg et al. .......................... | 707/9 |

OTHER PUBLICATIONS

BEA Systems, Inc.—Server Software—Business Description, www.companyseek.com/beasystems-BEA.htm, Dec. 20, 2004.
Polan, Mike, Web Services Provisioning—Understanding and Using Web Services Hosting Technology, www-106.ibm.com/developersworks/library/we-wsht/?n-ws-1102, Jan. 1, 2002.

* cited by examiner

*Primary Examiner* — Joe Chacko
(74) *Attorney, Agent, or Firm* — Law Office of Jim Boice

(57) ABSTRACT

A method, apparatus and computer-usable medium for executing, at an Entitlement Broker Service (EBS), a request from a requesting user for a protected computer resource that is available only to entitled users. Entitlement identifications are located using a Standardized Entitlement Credentials Data Store (SECDS) in the EBS. The SECDS contains entitlement identification in a standardized format that can be used to contact an Entitlement Source (ES) for entitlement information regarding the requesting user and the requested protected computer resource. The located entitlement information, for the requesting user, is then transmitted from the EBS to an External Client Application (ECA) that manages the protected computer resource, thus affording the requesting user access to the protected computer resource.

17 Claims, 20 Drawing Sheets

MATCHING ENTITLEMENT INFORMATION FOR MULTIPLE SOURCES

BACKGROUND OF THE INVENTION

The present invention relates in general to the field of computers and similar technologies, and in particular to software utilized in this field.

Early computers were stand-alone units, which accessed and processed only local databases using local computer programs. Today, however, modern computers are often networked, thus providing client computers on a network access to a variety of resources, including data, computer programs, hardware devices (including storage drives and printers), etc. This resource availability is especially prevalent with the advent of the Internet, World Wide Web, private intranets and extranets, etc., which provide access to web pages, databases, programs and similar resources. However, access to such resources is often limited to only authorized users and/or client computers.

SUMMARY OF THE INVENTION

The present invention includes, but is not limited to, a method, apparatus and computer-usable medium for receiving, at an External Client Application (ECA) that regulates access to protected computer resources, a request from a requesting user for a protected computer resource, wherein the protected computer resource is available only to entitled users; sending, from an External Authentication Application (EAA) to an Entitlement Broker Service (EBS), an entitlement credential identifying one or more entitled users who are entitled to access protected computer resources; sending, from the EBS to an Entitlement Source (ES), a request for entitlement information for the requesting user; receiving, at the EBS, entitlement information for the requesting user; and transmitting the entitlement information, for the requesting user, from the EBS to the ECA, wherein the requesting user is able to access protected computer resources according to information in the entitlement information.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

A method, apparatus and computer-usable medium is presented for executing, at an Entitlement Broker Service (EBS), a request from a requesting user for a protected computer resource, which is available only to entitled users. An External Client Application (ECA) controls/protects/offers access to a Repository of Protected Computer Resources (RPCR). When the requesting user attempts to access a protected computer resource in the RPCR, the ECA sends a query to the EBS asking for entitlement information that will allow the requesting user to access the protected computer resource. The EBS obtains an entitlement credential (i.e., identifier) for the requesting user from an External Authentication Application (EAA), and stores the entitlement credential in a local Standardized Entitlement Credentials Data Store (SECDS). The entitlement credential includes customer numbers, user identifiers (IDs), passwords and other identifying information for users. Using the requesting user's entitlement credential from the SECDS, the EBS contacts one or multiple Entitlement Sources (ESes) for entitlement information for the requesting user. This entitlement information includes information that reflects specific users' entitlement to access particular computer resources.

The entitlement information is returned to the EBS, which then forwards the entitlement information to the ECA that controls access to the protected computer resource that was requested by the requesting user, thus permitting the requesting user to access the protected computer resource. In one embodiment, the entitlement information is cached in a Persistence Mechanism (PM) in the EBS. Similarly, the SECDS can contain status information about previous requests for entitlement information, thus providing an indication of availability/non-availability of entitlement information for a specific user and a specific computer resource, and/or the existence of a copy of the entitlement information in the PM.

Figure 1:
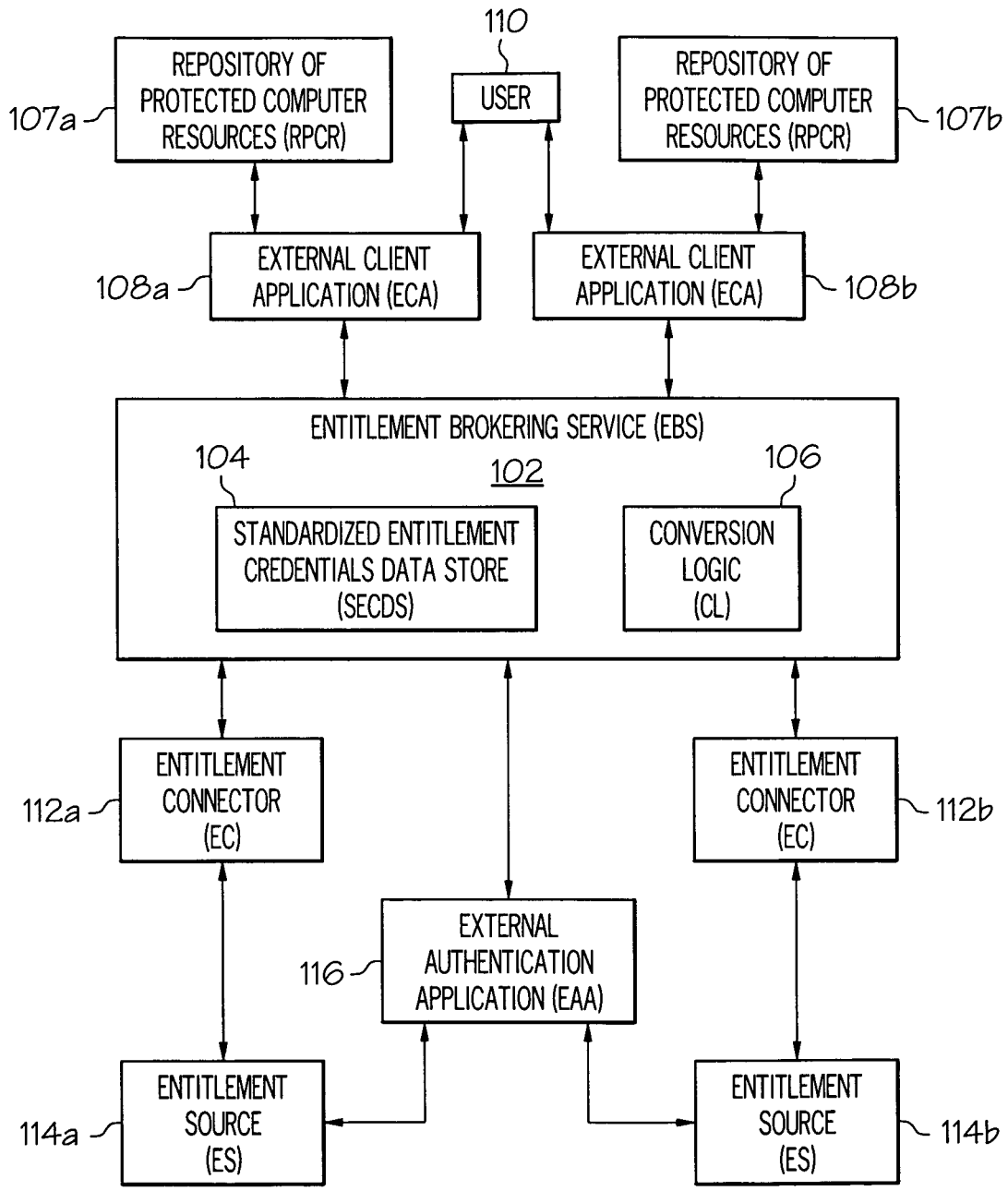
FIG. 1 illustrates an overview of entities used to manage authorization for a user to access protected computer resources that are managed by an External Client Application (ECA)

With reference now to the figures, and in particular to FIG. 1, there is depicted an overview of resources utilized by the present invention. An Entitlement Brokering Service (EBS) 102 contains a Standardized Entitlement Credentials Data Store (SECDS) 104. EBS 102 contains a Conversion Logic (CL) 106, which is capable of converting users' entitlement credentials (i.e., identifiers) stored in SECDS 104 into a format used by a protected computer resource, such as those found in Repository of Protected Computer Resources (RPCR) 107, which are managed/supported/accessed by External Client Applications (ECA) 108.

When a user 110 requests access to a computer resource from RPCR 107 via an ECA 108, such as ECA 108a, then ECA 108a transmits a message to EBS 102 asking for all entitlement information that EBS 102 has for user 110. EBS 102 communicates, via an extensible set of Entitlement Connectors (EC) 112, a request for this entitlement information from a set of known Entitlement Sources (ES) 114. EBS 102 also makes use of an External Authentication Application (EAA) 116 to identify user 110. In one embodiment, ECAs 108 also use EAA 116, which contains user identification data for each user, including user 110. EAA 116 thus allows EBS 102 and ECAs 108 to both identify user 110 according to a same user criteria. As described below, user 110 may also be able to directly access EAA 116 to update user 110's user identifier (ID).

Once ECA 108a receives all of the requested entitlement information from EBS 102, then ECA 108a decides whether user 110 is authorized to access RPCR 107, and affords such access if so authorized. Thus, EBS 102 does not need to understand any business requirements/rules/logic that an ECA 108 may use to determine user 110's authority to access one or more protected computer resources in RPCR 107. Rather, EBS 102 simply brokers entitlement information from known sources (i.e., ESes 114) and presents that entitlement information to ECA 108 in a format that allows the ECA 108 to make the authorization decision.

Details of FIG. 1 are provided below in FIGS. 2a to 5b, which are presented in exemplary manner to provide an expanded explanation of some or all of the novel features of the present invention.

Communicating With Entitlement Sources

Figure 2A:
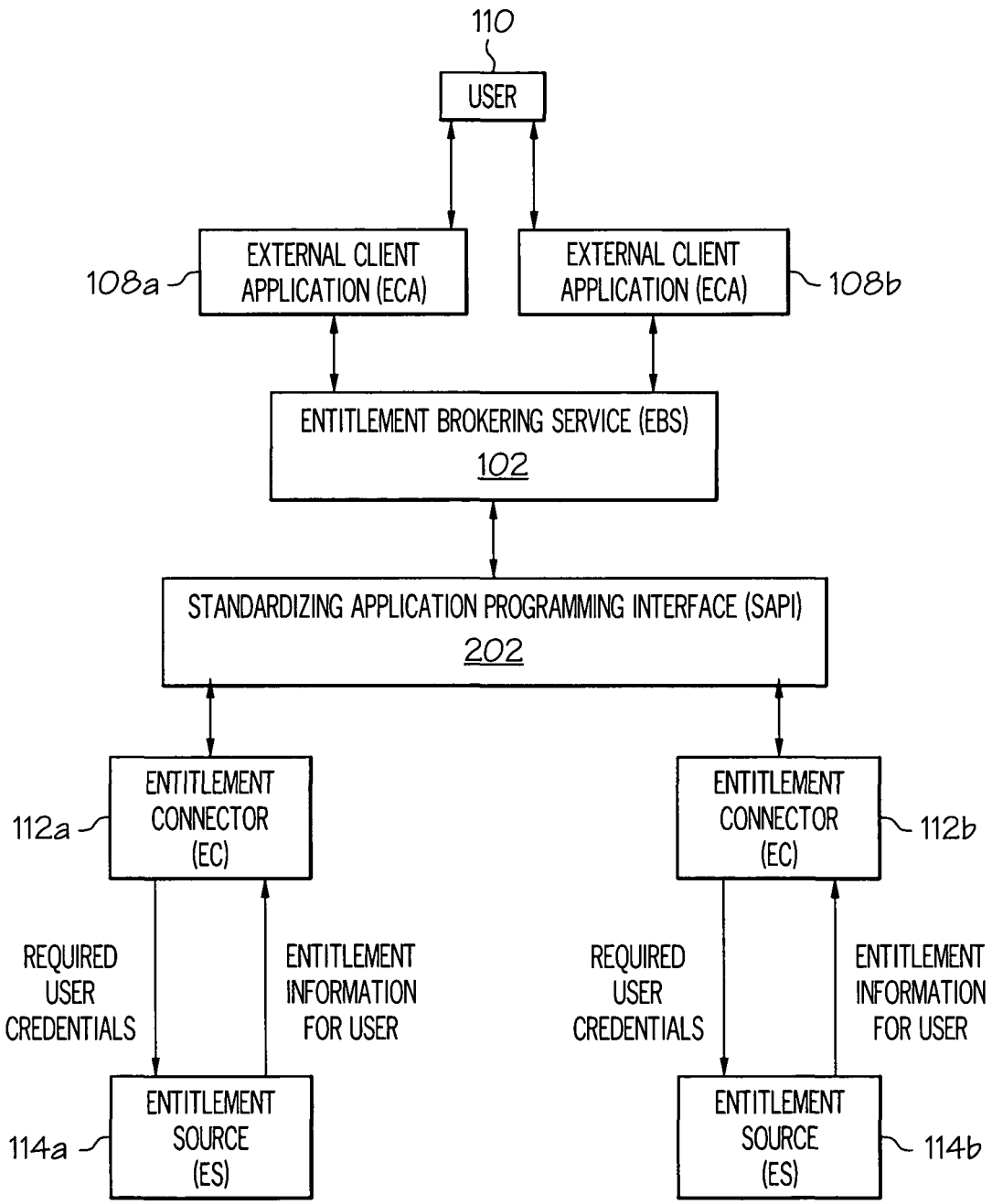
FIGS. 2a-b depict a block diagram of entities and a flow chart of steps taken to communicate with entitlement sources.

Referring now to FIG. 2a, a block diagram is presented showing components used by EBS 102 to communicate with ECs 112 using a Standardizing Application Programming Interface (SAPI) 202, which includes a set of definitions for EBS 102 to communicate with ECs 112.

Figure 2B:
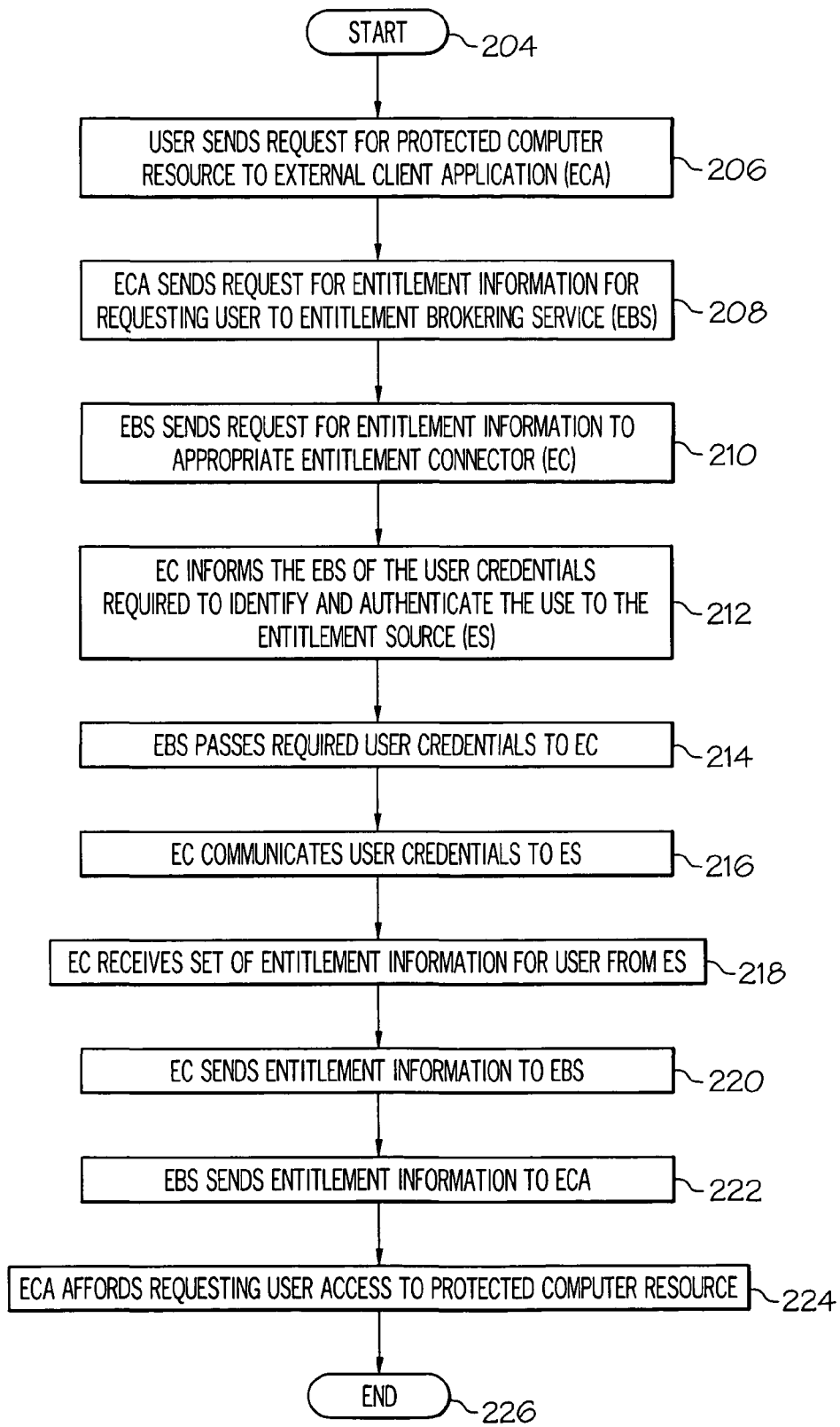

An exemplary set of steps taken by EBS 102 to communicate with ESes 114 is shown in FIG. 2b. After initiator block 204, a user 110 sends a request for access to a specific protected computer resource in one or more ECAs 108, such as ECA 108a (block 206). The requested protected computer resource from RPCR 107 (shown in FIG. 1) may be a website, a database, a computer program, a piece or group of hardware, including a computing device, a storage device, a printer, etc. ECA 108a then sends a request for entitlement information for requesting user 110 to EBS 102 (block 208). EBS 102 then sends a request for entitlement information to an appropriate EC 112, such as EC 112a, which is associated with one or more specific ESes 114, including ES 114a (block 210). EC 112a then sends back a message to EBS 102, informing EBS 102 which user credentials are required to identify and authenticate user 110 as an authorized user of the requested ECA 108a (block 212). Examples of such required credentials are an active (e.g., paid) membership subscription/program/service that is known to ES 114, membership in a particular user age group or geographical region, employment status with a particular enterprise, enrollment in an education institute, etc.

EBS 102 then passes the required user credentials (block 214), extracted from EBS 102's SECDS 104, to EC 112a. EC 112a then communicates these user credentials to multiple ESes 114, including ES 114a (block 216). Note that different ECs 112 may be passed different types of user credentials, which may or may not include user identification data provided to EAA 116. For example, ES 114a may use a customer number to identify each user, while ES 114b might require a user ID and a password. EBS 102 thus may rely on SECDS 104 to maintain these various entitlement credentials in a record identified as belonging to user 110 (e.g., by user 110's identifier data as supplied by EAA 116).

As described at block 218, EC 112a receives the requisite entitlement information from ES 114a. This entitlement information describes which specific protected computer resource or group of protected computer resources from RPCR 107a are available to (authorized for) user 110. EC 112a forwards this entitlement information to EBS 102 (block 220), which sends it on to ECA 108a (block 222), allowing ECA 108a to afford user 110 access to the protected computer resource that is managed by ECA 108a (block 224). The process thus ends at terminator block 226.

Gathering User Entitlement Credentials

Figure 3A:
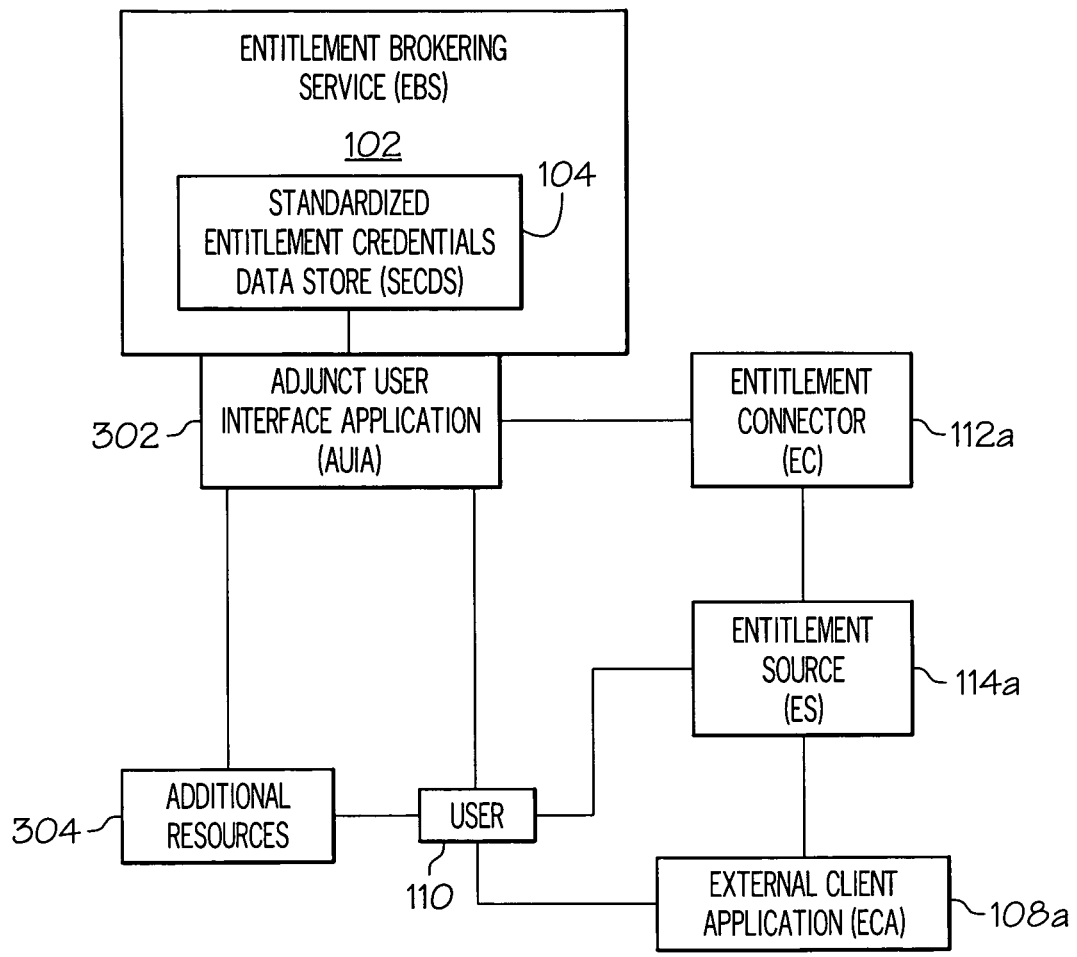
FIGS. 3a-b illustrate a block diagram of entities and a flow chart of steps taken to gather user entitlement credentials and to broker user entitlements.

Referring now to FIG. 3a, components used to gather user entitlement credentials are depicted. EBS 102 provides an Adjunct User Interface Application (AUIA) 302, which allows user 110 to populate his record in SECDS 104. Note that AUIA 302 is dynamic and adaptable, and is able to associate (correlate) user 110 with entitlement credentials for one or more users. If an Entitlement Source 114 (e.g., ES 114a) determines that user 110 does not possess an appropriate entitlement information to access the resource he is requesting (e.g., ES 114a), then ES 114a directs user 110 to AUIA 302 in order to provide additional entitlement credentials (if available to user 110) to EBS 102 and SECDS 104. By referencing a set of ESes 114 identified by ECA 108a, AUIA 302 configures itself to gather only those credentials that are appropriate to the set of ESes 114 that could provide access to the requested ECA 108a. Furthermore, AUIA 302 can provide access to additional resources 304, such as online e-commerce processes, help documentation, and other resources that can enable user 110 to obtain requisite entitlement information if he does not already possess it. Thus, AUIA 302 gathers entitlement credentials about user 110, which are stored in SECDS 104 and validated by ESes 114.

Note that while FIG. 3a correctly illustrates that user 110 is able to communicate with ES 114a, the process of gathering user entitlement credentials does not normally incorporate this communication. That is, user 110 is not primarily communicating with ES 114a during the process described above. Thus, ES 114a does not direct user 110 to AUIA 302, but rather the lack of entitlement for user 110 is communicated through EBS 102 to ECA 108a, which causes ECA 108a to direct user 110 to AUIA 302.

Figure 3B:
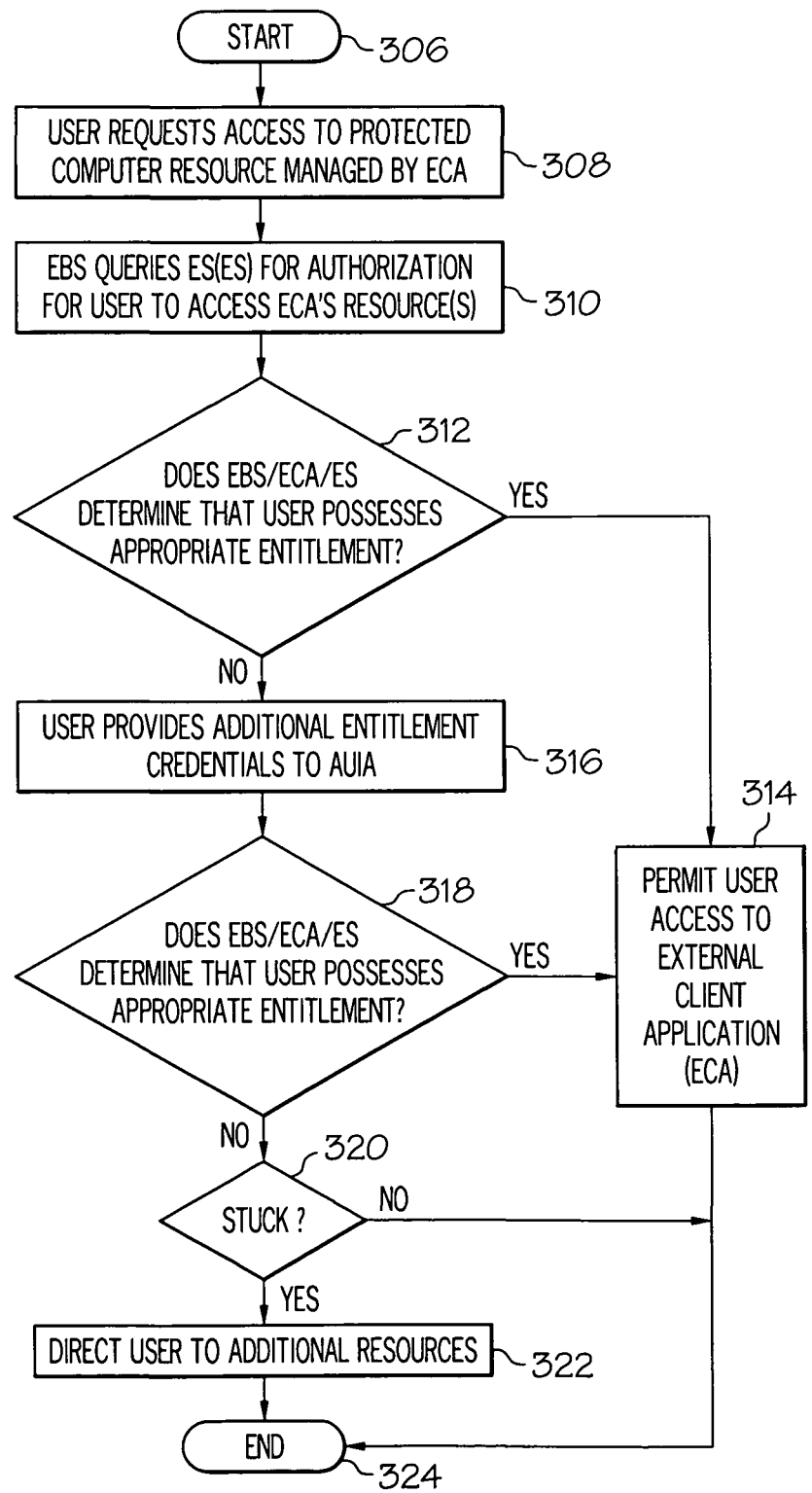

Steps for gathering user entitlement credentials are represented in exemplary manner in FIG. 3b, starting at initiator block 306. The user 110 requests access to a specific (one or more) protected computer resources that are managed by External Client Applications (ECA) 108, as described at block 308. EBS 102 queries the appropriate Entitlement Sources (ES) 114 for authorization for user 110 to access the requested protected computer resource(s) managed by ECA 108 (e.g., ECA 108a), as shown at block 310. EBS 102 and/or ECA 108a and/or ES 114a may determine that user 110 possesses the appropriate entitlement to access ECA 108a's protected computer resource(s) (query block 312). If so, then user 110 is permitted to access ECA 108a's protected computer resource(s) (block 314) and the process ends (terminator block 320). If not, then user 110 may provide additional entitlement credentials (if available) to AUIA 302, as described at block 316. Another entitlement query is made (query block 318), similar to that made at query block 312. If user 110 is entitled to access ECA 108a's protected computer resource(s), then it does so (block 314). Otherwise, the process ends (terminator block 324).

A query is made (query block 320) as to whether logic in AUIA 302 has determined that a user 110 is "stuck in a loop" in his request for entitlement information. If so, then user 110 may be directed to additional resources 304 (block 322), and the process ends (terminator block 324). Note that while the flow-chart in FIG. 3b includes terminator block 324 to comport with standard flow-chart convention, it is understood that any of the steps depicted may be kept in an open state by any appropriate logic/system shown in the figures.

Brokering User Entitlements

As described at block 310 in FIG. 3b, EBS 102 queries the appropriate Entitlement Sources (ES) 114 for authorization for user 110 to access the requested protected computer resource(s) managed by ECA 108a. In one embodiment, EBS 102 may query all known ESes 114, or ECA 108a may instruct EBS 102 to query only certain ESes 114. ECA 108a may choose to limit the query when it knows in advance that only certain ESes 114 could possibly provide the entitlement information needed to access a particular protected computer resource. When multiple ESes 114 are involved, EBS 102 may choose to communicate with all requested ESes 114 simultaneously (via ECs 112 shown in FIG. 1) rather than sequentially. This reduces the total amount of time needed to receive entitlement information from all queried ESes 114. Each EC 112 uses whatever communication methods and formats that are appropriate to request and receive entitlement information from its ES 114. Once all ECs 112 have finished their communications with the ESes 114, EBS 102 retrieves the entitlement information from each successful EC 112. ECs 112 provide this entitlement information in a standardized format and via AUIA 302, thus decoupling EBS 102 from the specific data formats used by the individual ESes 114.

Note that the query EBS 102 makes to ESes 114 does not include information about ECA 108. That is, while information about ECA 108 may be logically inferred by ESes 114, such information is not explicitly communicated. Thus, it is possible for ESes 114 to operate without knowledge of any of the ECAs 108.

Entitlement Identifier Filtering and Wildcard Expansion

Figure 4A:
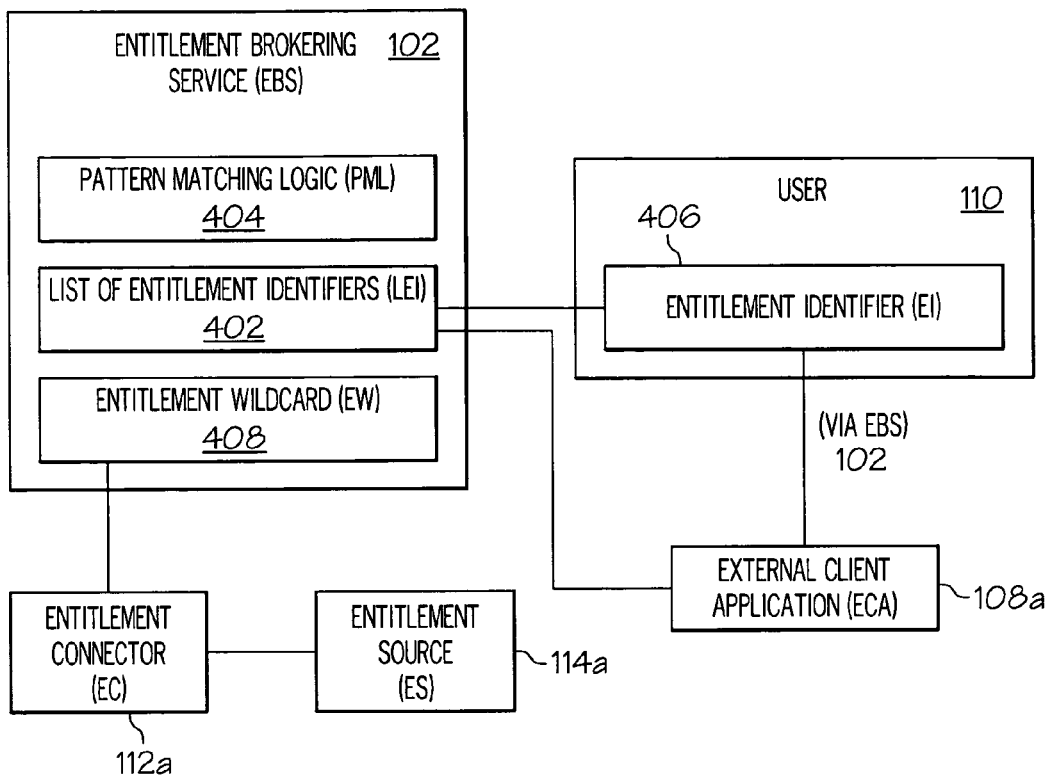
FIGS. 4a-b depict a block diagram of entities and a flow chart of steps taken to filter entitlement identifiers.

In its query to EBS 102, ECA 108a may choose to supply a List of Entitlement Identifiers (LEI) 402, as shown in FIG. 4a, that user 110 must possess to be granted access to the desired resource (e.g., ECA 108a). If so, EBS 102, upon receiving the responses from ES 114a via EC 112a, may filter each response so that EBS 102 returns to ECA 108a only those identifiers (e.g., user 110's Entitlement Identifier (EI) 406) that match those found in LEI 402 using a Pattern Matching Logic (PML) 404.

Additionally, ES 114a (or EC 112a) may implement business logic that allows it to return to EBS 102 an Entitlement Wildcard (EW) 408 for user(s) 110. If EBS 102 receives such an EW 408 from ES 114a (or EC 112a), and if ECA 108a has provided an LEI 402, then EBS 102 uses pattern matching algorithms to match the wildcard of EW 408 against LEI 402. If any matches are found, they replace the wildcard in the response that is returned to the querying ECA 108a. Thus, EW 408 allows filtering at EBS 102 that permits the requesting user 110 to access the protected computer resource if the requesting user 110 has only an incomplete portion of entitlement criteria required by the protected computer resource for access to the protected computer resource. Note that ESes 114 or ECs 112 provide the wildcards, rather than the request for the user's entitlement information from the ECA 108a.

Figure 4B:
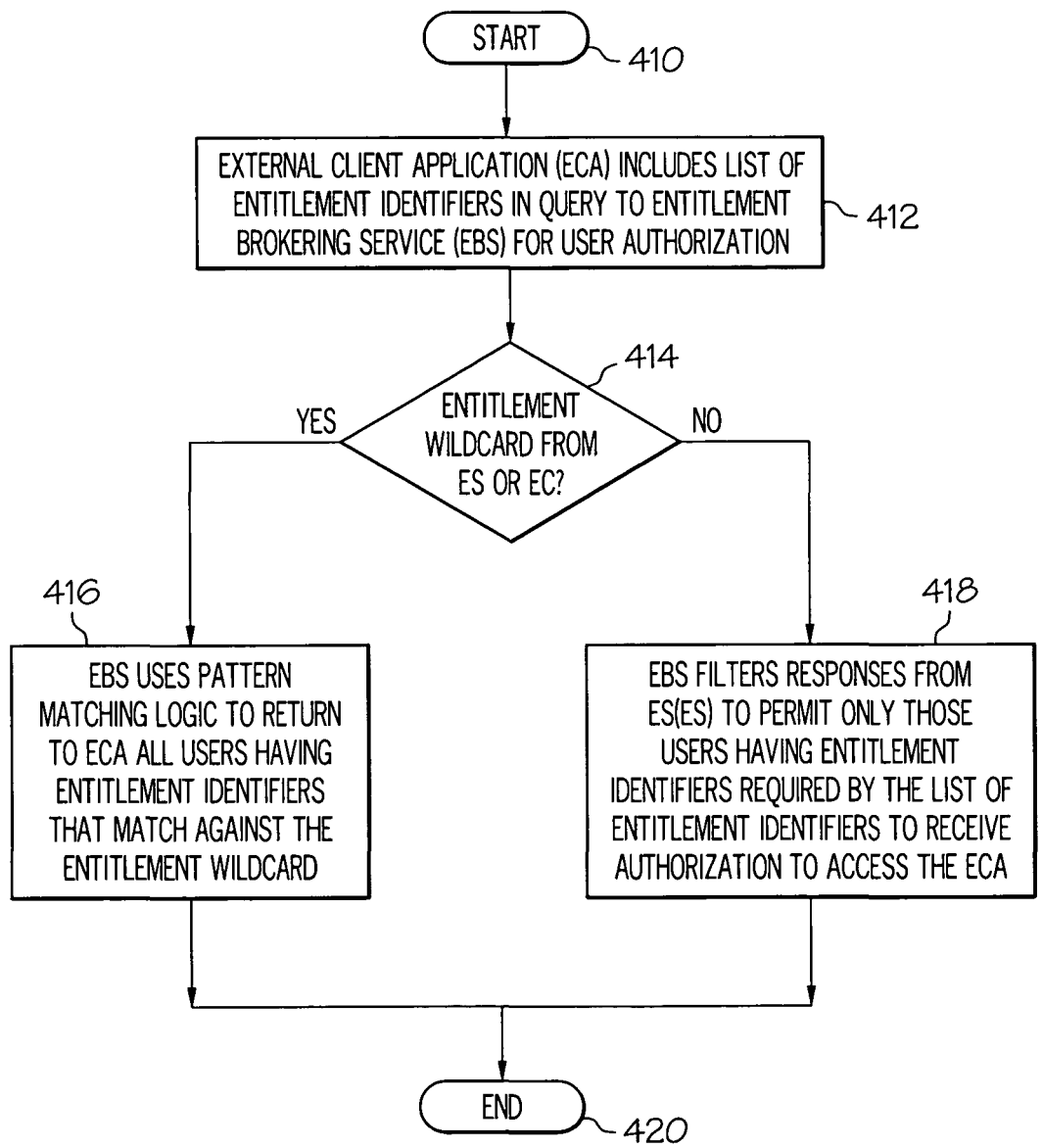

Thus, as shown in the exemplary steps of FIG. 4b, after initiator block 410, ECA 108a includes a list of entitlement identifiers in a query to EBS 102 for authorization for user 110 to access ECA 108a (block 412). If there is an entitlement wildcard (EW 414) sent from the Entitlement Connector (EC) 112 or the Entitlement Source (EC) 114, as queried at query block 414, then EBS 102 uses PML 404 to return to ECA 108a all entitlement identifiers that match against the entitlement wildcard (block 416). If there is no EW 408, then the EBS 102 filters the requests normally as described above (block 418), and the process ends (terminator block 420).

Caching Entitlement Responses

Figure 5A:
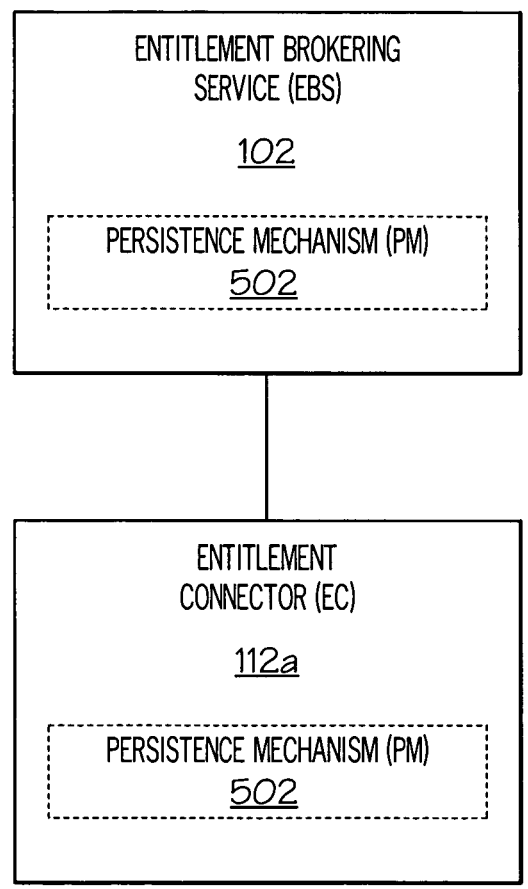
FIGS. 5a-b illustrate a block diagram of entities and a flow chart of steps taken to cache entitlement responses.

EBS 102 may provide a Persistence Mechanism (PM) 502, as shown in FIG. 5a, to store locally the results of recent queries to the known Entitlement Sources (ES) 114 in EBS 102 or EC 112a. This makes subsequent entitlement queries more efficient if user 110 continues to request protected resources that are entitled by the same set of ESes 114. The efficiency results from being able to retrieve user 110's entitlement information from a local, fast data store in EC 112a or EBS 102, rather than having to make a request to an external ES 114.

Figure 5B:
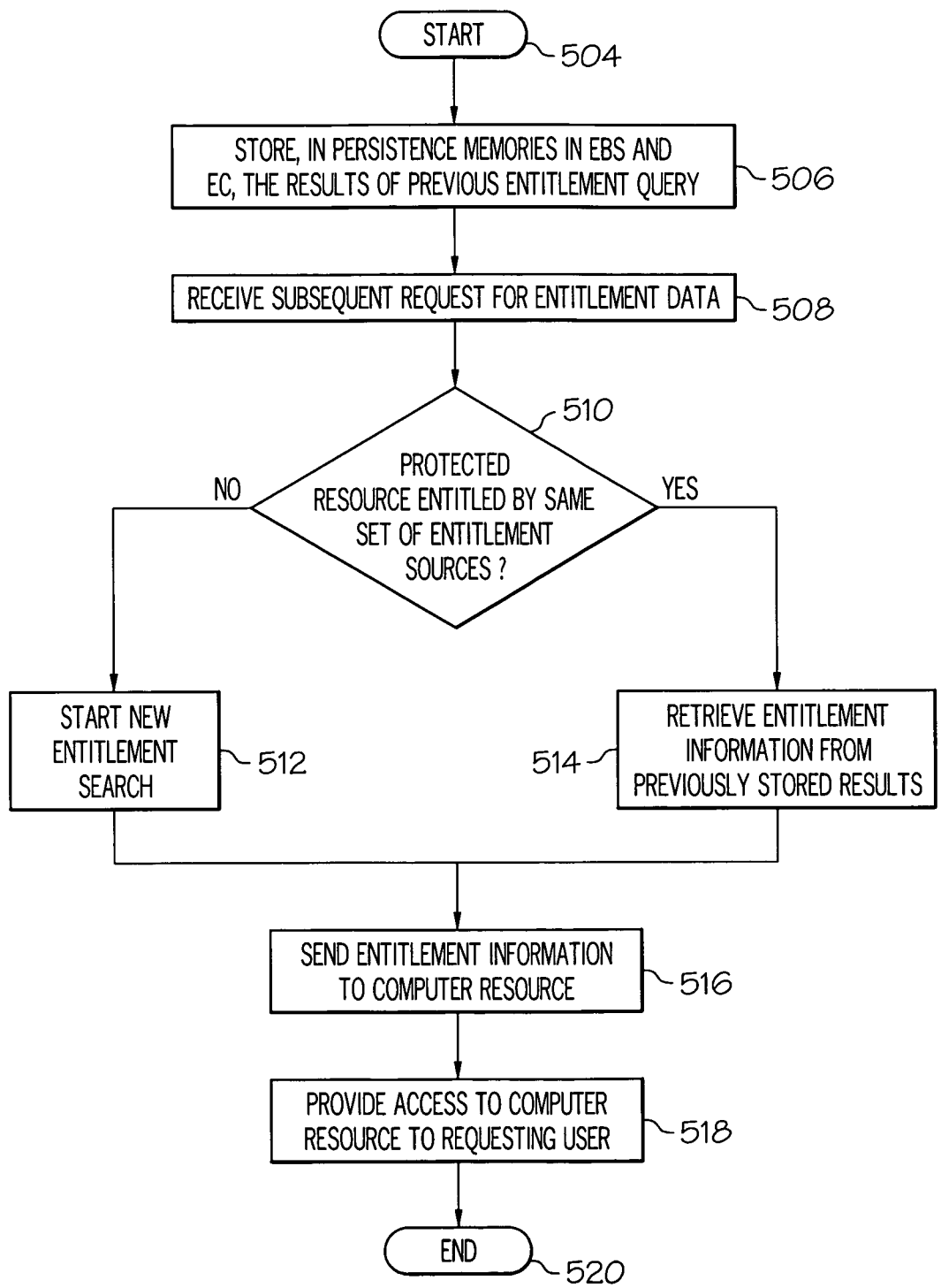

The steps for caching entitlement responses are shown in exemplary steps in FIG. 5b, beginning at initiator block 504. As shown in block 506, results (entitlement information) from previous entitlement queries is stored in PM 502 (either in EBS 102 or in an EC 112, such as EC 112a). EBS 102 then receives a subsequent request for entitlement information (block 508). If access to the requested protected resource is based on a same set of entitlement sources previously queried (query block 510), then previously retrieved and stored entitlement information is retrieved (block 514) from the local cache in PM 502 (shown in FIG. 5a). This entitlement information is then sent to the computer resource (block 516), and can be used to permit the user to access the computer resource (block 518) to end the process (terminator block 520). Otherwise, a new entitlement information search is performed (block 512) using techniques described above.

Figure 6:
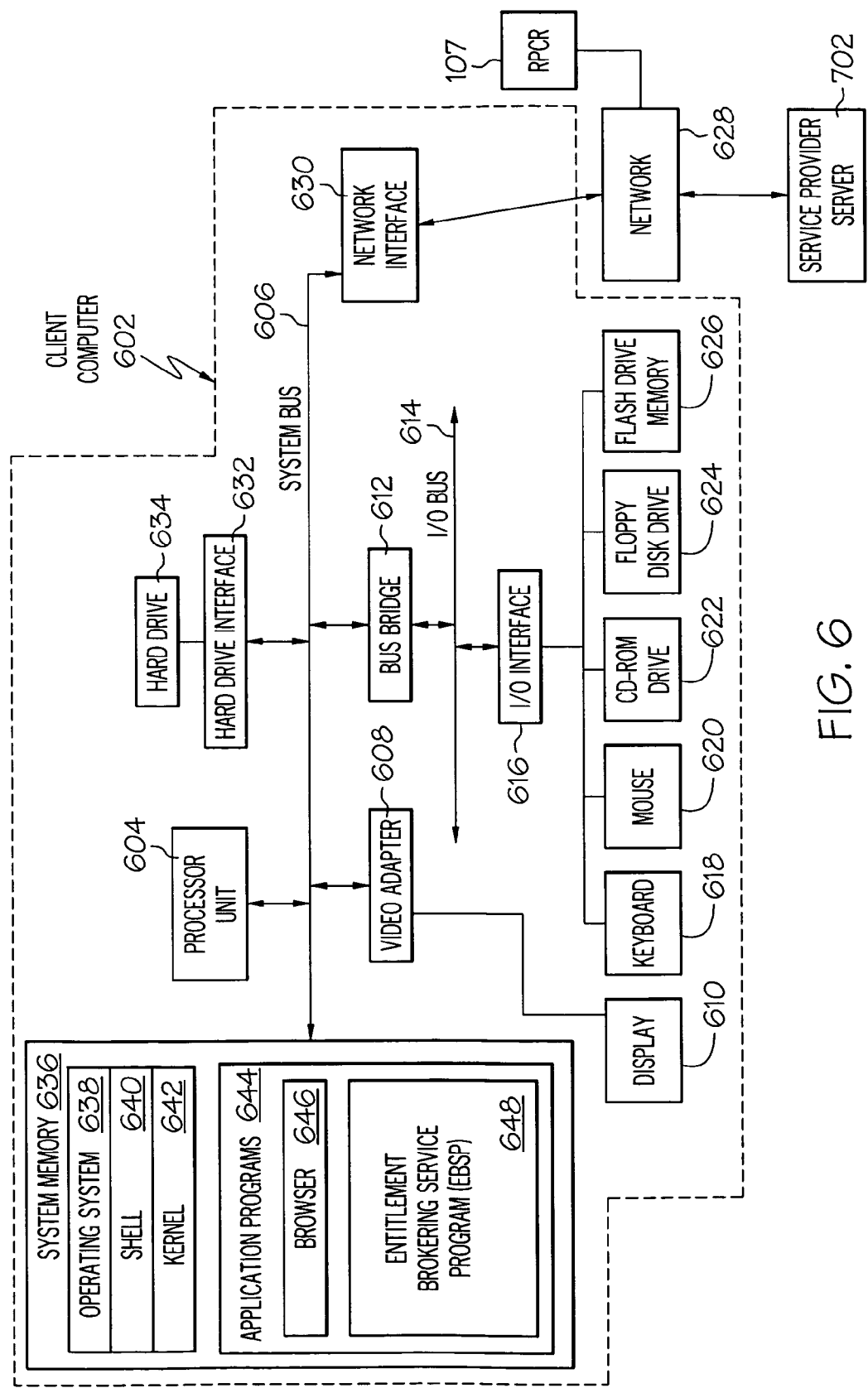
FIG. 6 depicts an exemplary client computer in which the present invention may implemented.

With reference now to FIG. 6, there is depicted a block diagram of an exemplary client computer 602, in which the present invention may be utilized. Client computer 602 includes a processor unit 604 that is coupled to a system bus 606. A video adapter 608, which drives/supports a display 610, is also coupled to system bus 606. System bus 606 is coupled via a bus bridge 612 to an Input/Output (I/O) bus 614. An I/O interface 616 is coupled to I/O bus 614. I/O interface 616 affords communication with various I/O devices, including a keyboard 618, a mouse 620, a Compact Disk-Read Only Memory (CD-ROM) drive 622, a floppy disk drive 624, and a flash drive memory 626. The format of the ports connected to I/O interface 616 may be any known to those skilled in the art of computer architecture, including but not limited to Universal Serial Bus (USB) ports.

Client computer 602 is able to communicate with a service provider server 702 via a network 628 using a network interface 630, which is coupled to system bus 606. Network 628 may be an external network such as the Internet, or an internal network such as an Ethernet or a Virtual Private Network (VPN). Using network 628, client computer 602 is able to use the present invention to access, either directly or through the use of service provider server 702, the protected computer resources found in RPCR 107.

A hard drive interface 632 is also coupled to system bus 606. Hard drive interface 632 interfaces with a hard drive 634. In a preferred embodiment, hard drive 634 populates a system memory 636, which is also coupled to system bus 606. Data that populates system memory 636 includes client computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present invention will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a browser 646. Browser 646 includes program modules and instructions enabling a World Wide Web (WWW) client (i.e., client computer 602) to send and receive network messages to the Internet using HyperText Transfer Protocol (HTTP) messaging, thus enabling communication with service provider server 702.

Application programs 644 in client computer 602's system memory also include an Entitlement Brokering Service Program (EBSP) 648. EBSP 648 includes code for implementing the processes described in FIGS. 1-5 by and for Entitlement Brokering Service (EBS) 102. In one embodiment, client computer 602 is able to download EBSP 648 from service provider server 702.

The hardware elements depicted in client computer 602 are not intended to be exhaustive, but rather are representative to highlight essential components required by the present invention. For instance, client computer 602 may include alternate memory storage devices such as magnetic cassettes, Digital Versatile Disks (DVDs), Bernoulli cartridges, and the like. These and other variations are intended to be within the spirit and scope of the present invention.

Figure 7:
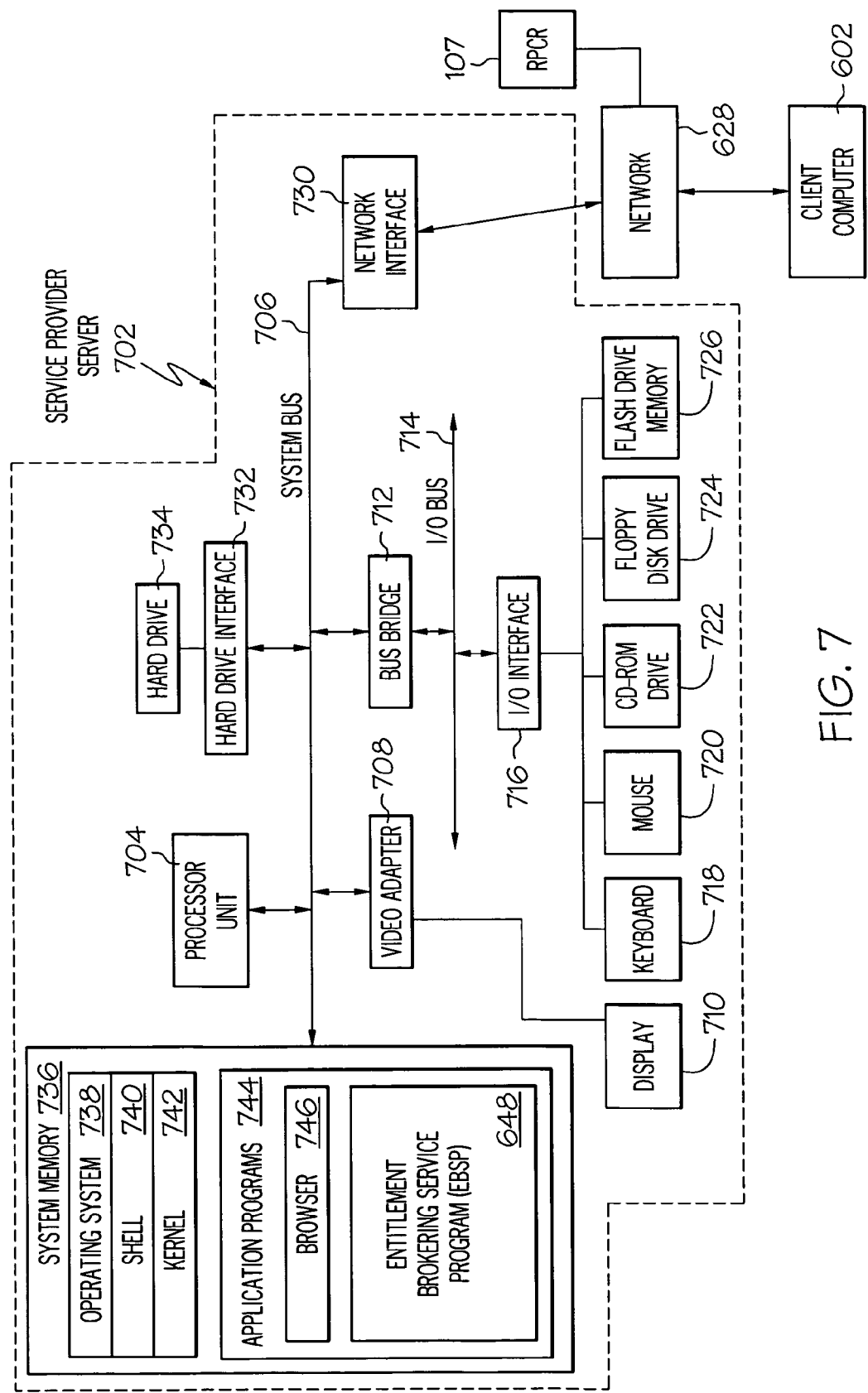
FIG. 7 illustrates an exemplary server from which software for executing the present invention may be deployed and/or implemented for the benefit of a user of the client computer shown in FIG. 6.

As noted above, EBSP 648 can be downloaded to client computer 702 from service provider server 702, shown in exemplary form in FIG. 7. Service provider server 702 includes a processor unit 704 that is coupled to a system bus 706. A video adapter 708 is also coupled to system bus 706. Video adapter 708 drives/supports a display 710. System bus 706 is coupled via a bus bridge 712 to an Input/Output (I/O) bus 714. An I/O interface 716 is coupled to I/O bus 714. I/O interface 716 affords communication with various I/O devices, including a keyboard 718, a mouse 720, a Compact Disk-Read Only Memory (CD-ROM) drive 722, a floppy disk drive 724, and a flash drive memory 726. The format of the ports connected to I/O interface 716 may be any known to those skilled in the art of computer architecture, including but not limited to Universal Serial Bus (USB) ports.

Service provider server 702 is able to communicate with client computer 602 via network 628 using a network interface 730, which is coupled to system bus 706. Access to network 628 allows service provider server 702 to access protected resources in RPCR 107, and to use EBSP 648 and the present invention to control access of such protected resources in RPCR 107 to client computer 602 and user 110.

System bus 706 is also coupled to a hard drive interface 732, which interfaces with a hard drive 734. In a preferred embodiment, hard drive 734 populates a system memory 736, which is also coupled to system bus 706. Data that populates system memory 736 includes service provider server 702's operating system 738, which includes a shell 740 and a kernel 742. Shell 740 is incorporated in a higher level operating system layer and utilized for providing transparent user access to resources such as application programs 744, which include a browser 746, and a copy of EBSP 648 described above, which can be deployed to client computer 602.

The hardware elements depicted in service provider server 702 are not intended to be exhaustive, but rather are representative to highlight essential components required by the present invention. For instance, service provider server 702 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 702 performs all of the functions associated with the present invention (including execution of EBSP 648), thus freeing client computer 602 from using its resources to access protected resources in RPCR 107.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the process described by the present invention, including the functions of EBSP 648 are performed by service provider server 702. Alternatively, EBSP 648 and the method described herein, and in particular as shown and described in FIGS. 1-5, can be deployed as a process software from service provider server 702 to client computer 602. Still more particularly, process software for the method so described may be deployed to service provider server 702 by another service provider server (not shown).

Figure 8A:
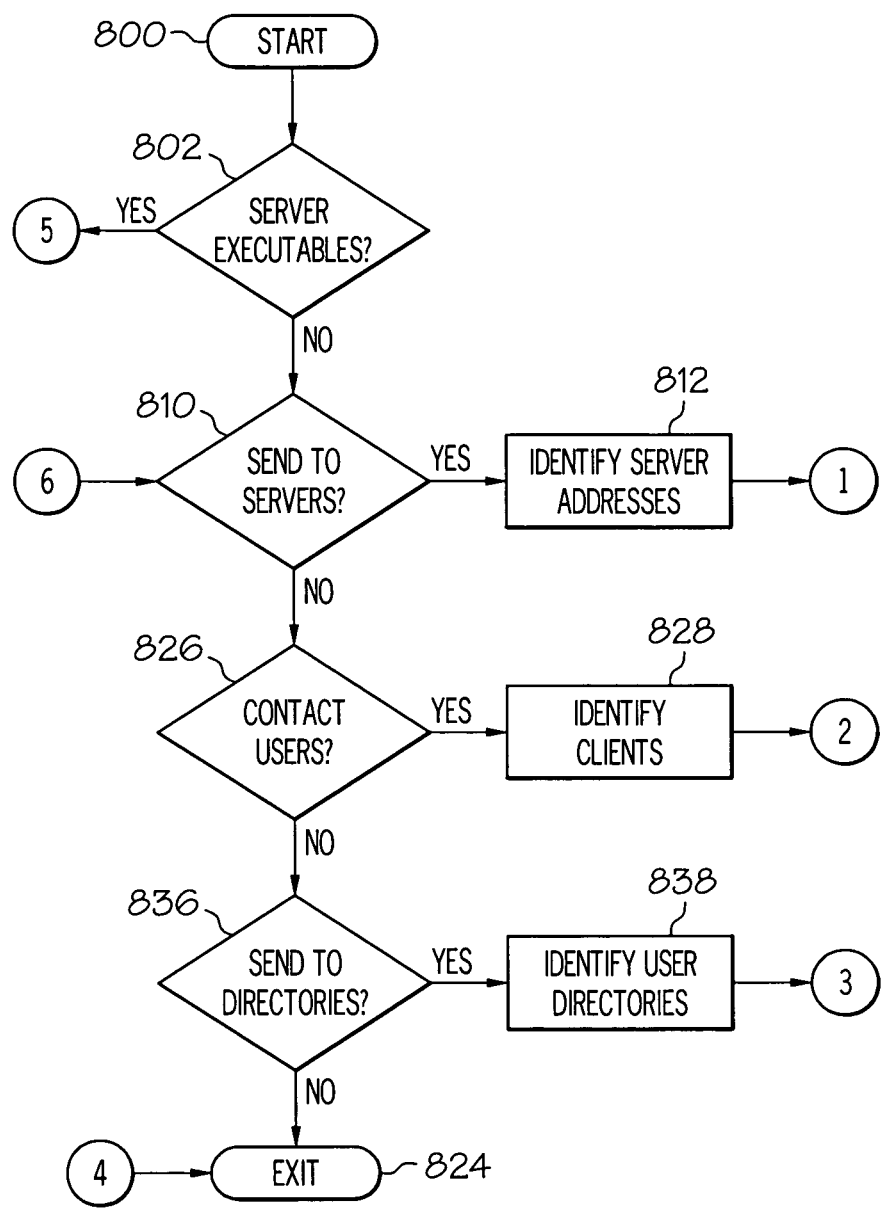
FIGS. 8a-b show a flow-chart of steps taken to deploy software capable of executing the steps shown and described in FIGS. 1-5.
Figure 8B:
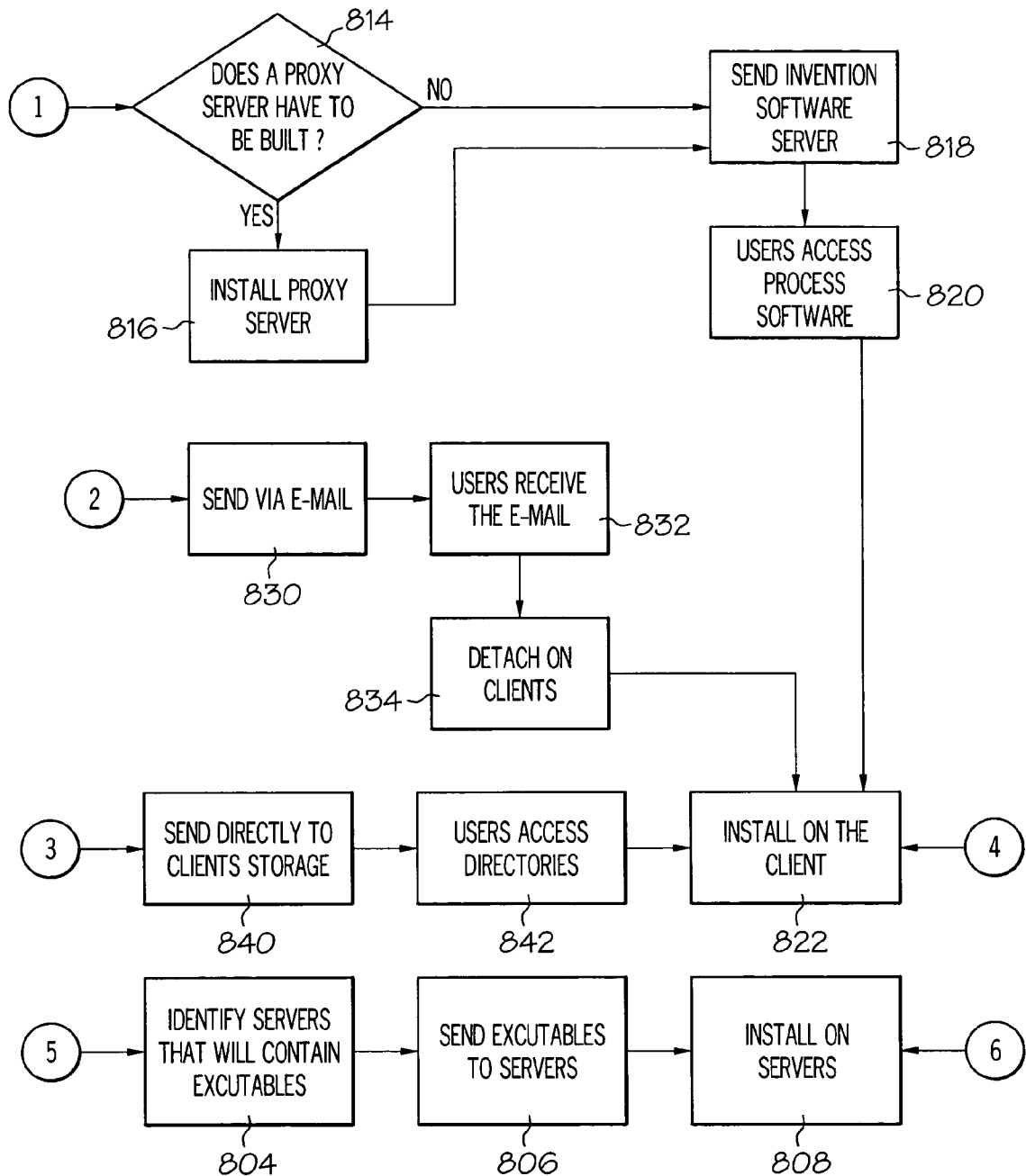

Referring then to FIG. 8, step 800 begins the deployment of the process software. The first thing is to determine if there are any programs that will reside on a server or servers when the process software is executed (query block 802). If this is the case, then the servers that will contain the executables are identified (block 804). The process software for the server or servers is transferred directly to the servers' storage via File Transfer Protocol (FTP) or some other protocol or by copying though the use of a shared file system (block 806). The process software is then installed on the servers (block 808).

Next, a determination is made on whether the process software is to be deployed by having users access the process software on a server or servers (query block 810). If the users are to access the process software on servers, then the server addresses that will store the process software are identified (block 812).

A determination is made if a proxy server is to be built (query block 814) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 816). The process software is sent to the servers either via a protocol such as FTP or it is copied directly from the source files to the server files via file sharing (block 818). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 820). Another embodiment is to have the servers automatically copy the process software to each client and then run the installation program for the process software at each client computer. The user executes the program that installs the process software on his client computer (block 822) then exits the process (terminator block 824).

In query step 826, a determination is made whether the process software is to be deployed by sending the process software to users via e-mail. The set of users where the process software will be deployed are identified together with the addresses of the user client computers (block 828). The process software is sent via e-mail to each of the users' client computers (block 830). The users then receive the e-mail (block 832) and then detach the process software from the e-mail to a directory on their client computers (block 834). The user executes the program that installs the process software on his client computer (block 822) then exits the process (terminator block 824).

Lastly a determination is made on whether to the process software will be sent directly to user directories on their client computers (query block 836). If so, the user directories are identified (block 838). The process software is transferred directly to the user's client computer directory (block 840). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 842). The user executes the program that installs the process software on his client computer (block 822) and then exits the process (terminator block 824).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 9A:
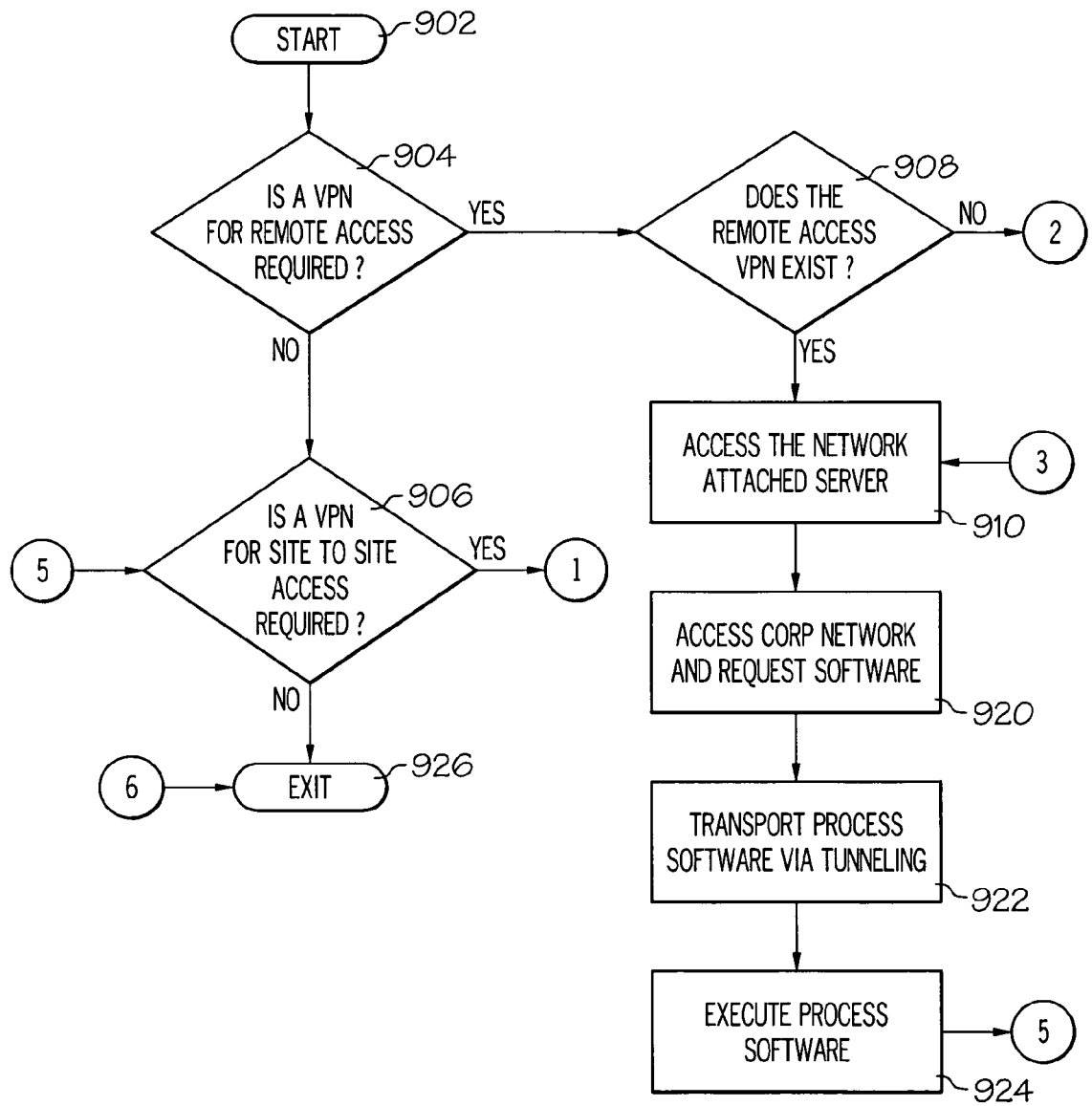
FIGS. 9a-c show a flow-chart of steps taken to deploy in a Virtual Private Network (VPN) software that is capable of executing the steps shown and described in FIGS. 1-5.
Figure 9B:
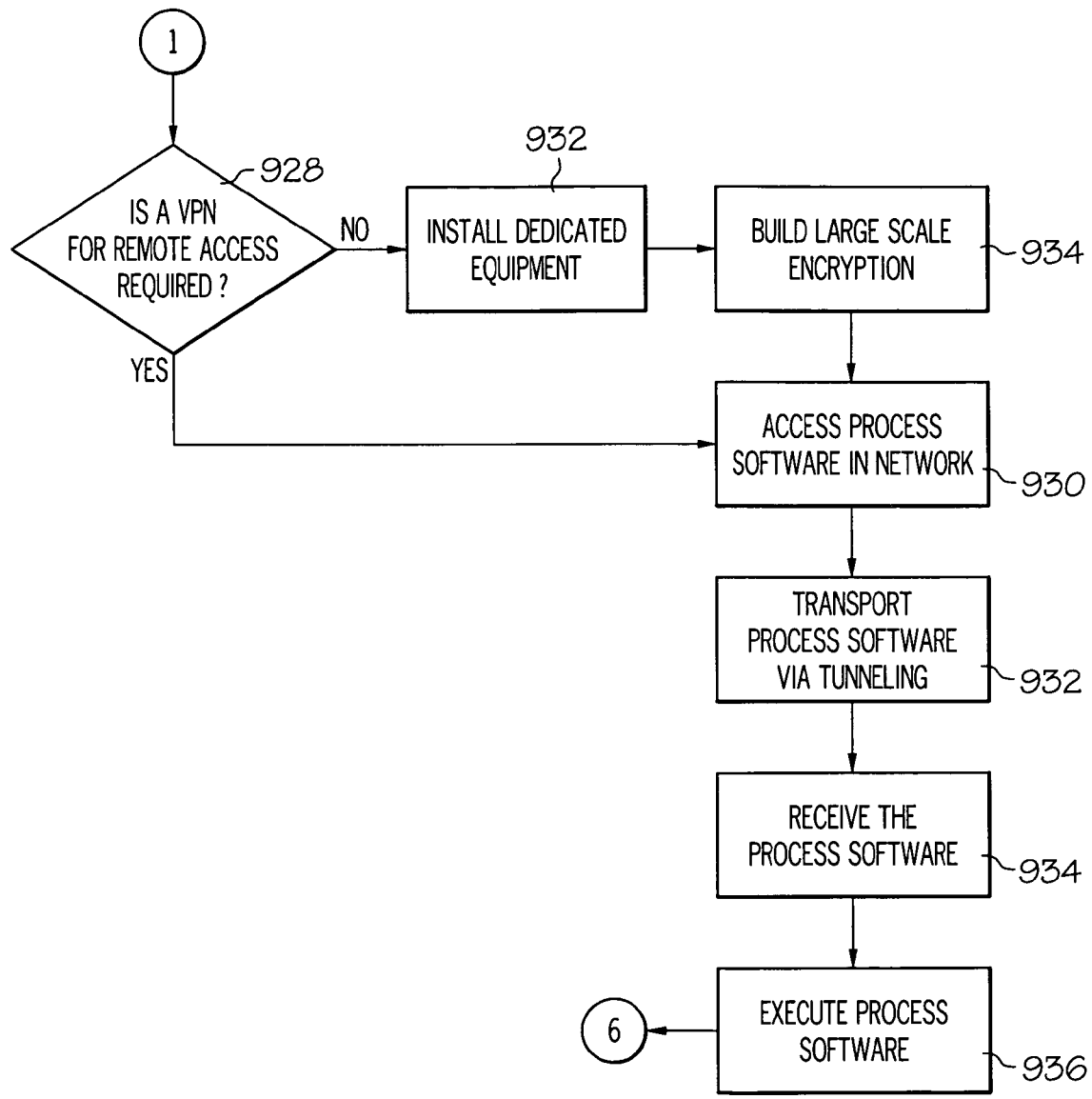
Figure 9C:
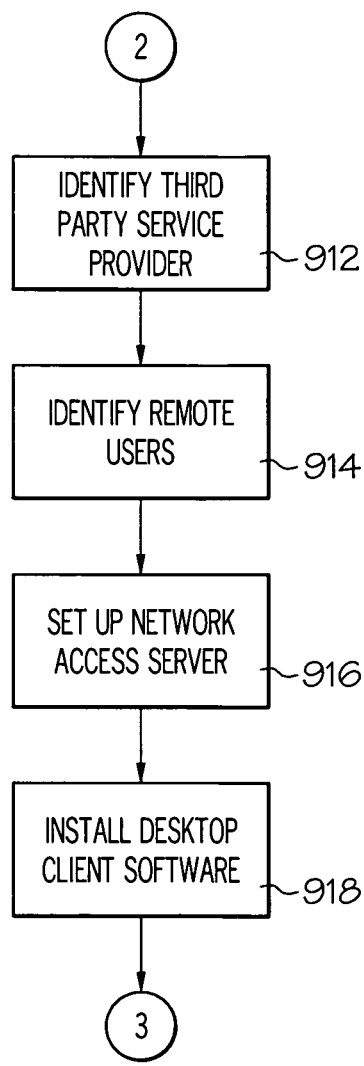

The process for such VPN deployment is described in FIG. 9. Initiator block 902 begins the Virtual Private Network (VPN) process. A determination is made to see if a VPN for remote access is required (query block 904). If it is not required, then proceed to (query block 906). If it is required, then determine if the remote access VPN exists (query block 908).

If a VPN does exist, then proceed to block 910. Otherwise identify a third party provider that will provide the secure, encrypted connections between the company's private network and the company's remote users (block 912). The company's remote users are identified (block 914). The third party provider then sets up a network access server (NAS) (block 916) that allows the remote users to dial a toll free number or attach directly via a broadband modem to access, download and install the desktop client software for the remote-access VPN (block 918).

After the remote access VPN has been built or if it been previously installed, the remote users can access the process software by dialing into the NAS or attaching directly via a cable or DSL modem into the NAS (block 910). This allows entry into the corporate network where the process software is accessed (block 920). The process software is transported to the remote user's desktop over the network via tunneling. That is the process software is divided into packets and each packet including the data and protocol is placed within another packet (block 922). When the process software arrives at the remote user's desk-top, it is removed from the packets, reconstituted and then is executed on the remote users desk-top (block 924).

A determination is then made to see if a VPN for site to site access is required (query block 906). If it is not required, then proceed to exit the process (terminator block 926). Otherwise, determine if the site to site VPN exists (query block 928). If it does exist, then proceed to block 930. Otherwise, install the dedicated equipment required to establish a site to site VPN (block 932). Then build the large scale encryption into the VPN (block 934).

After the site to site VPN has been built or if it had been previously established, the users access the process software via the VPN (block 930). The process software is transported to the site users over the network via tunneling (block 932). That is the process software is divided into packets and each packet including the data and protocol is placed within another packet (block 934). When the process software arrives at the remote user's desktop, it is removed from the packets, reconstituted and is executed on the site users desktop (block 936). The process then ends at terminator block 926.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 10A:
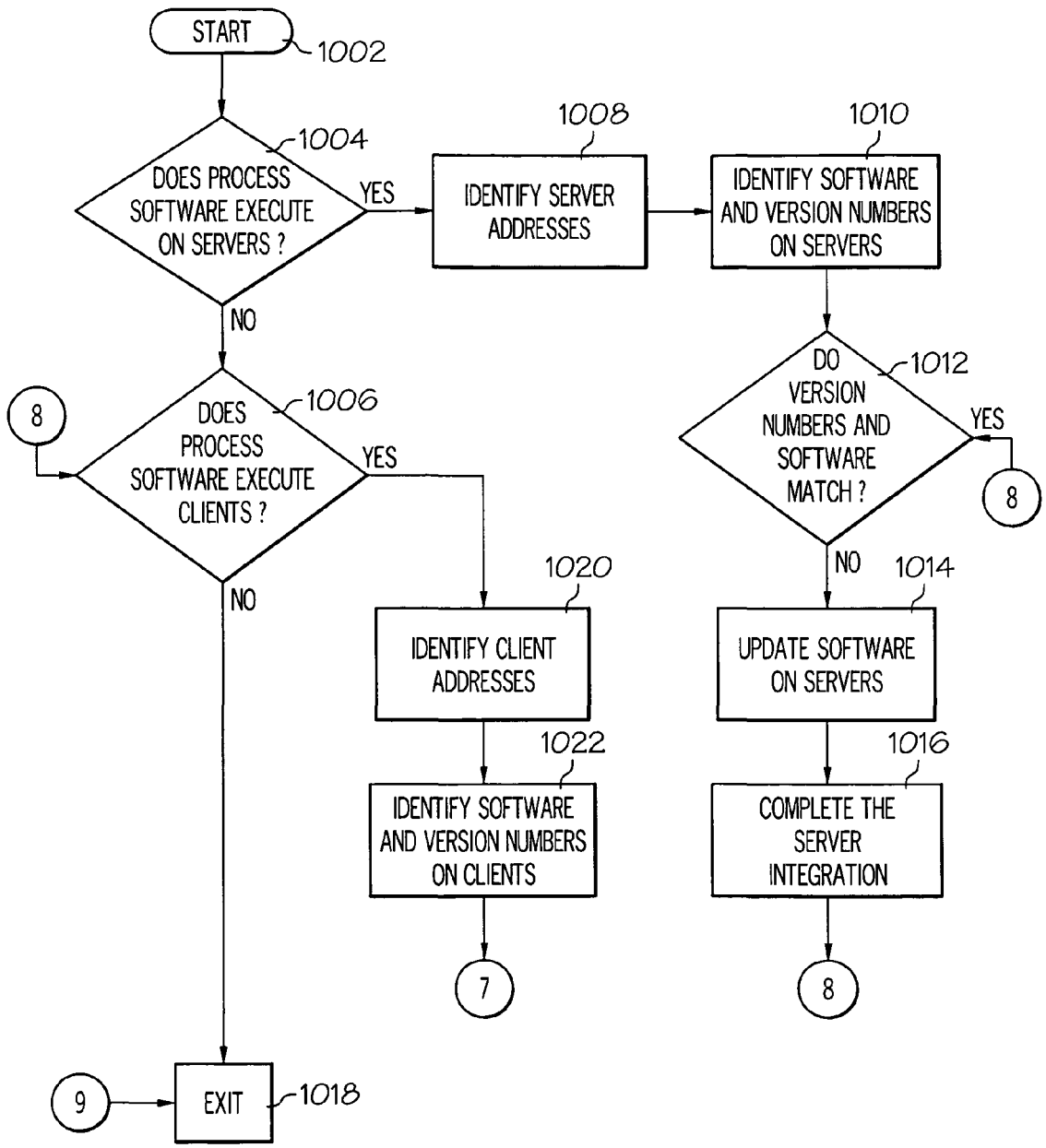
FIGS. 10a-b show a flow-chart showing steps taken to integrate into a computer system software that is capable of executing the steps shown and described in FIGS. 1-5.
Figure 10B:
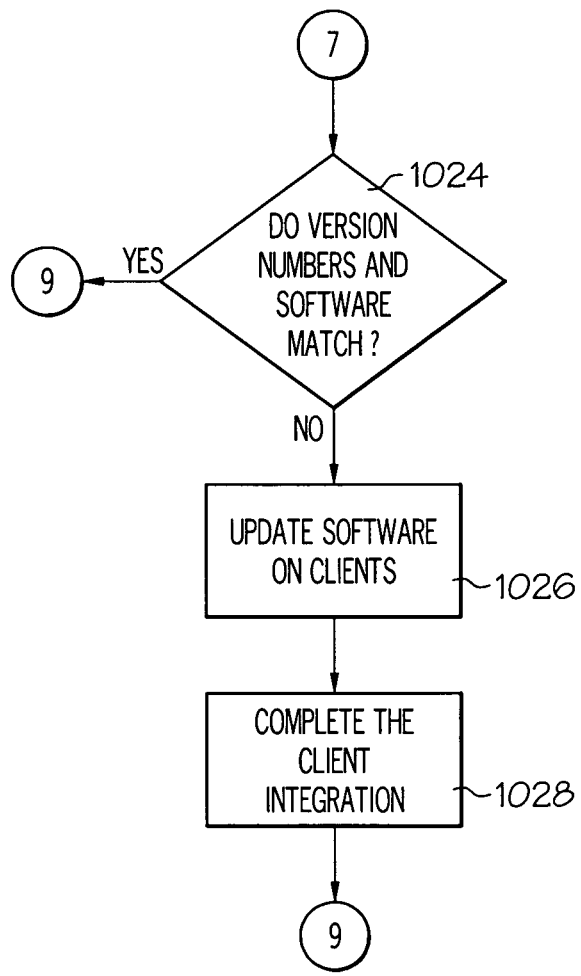

For a high-level description of this process, reference is now made to FIG. 10. Initiator block 1002 begins the integration of the process software. The first tiling is to determine if there are any process software programs that will execute on a server or servers (block 1004). If this is not the case, then integration proceeds to query block 1006. If this is the case, then the server addresses are identified (block 1008). The servers are checked to see if they contain software that includes the operating system (OS), applications, and network operating systems (NOS), together with their version numbers, which have been tested with the process software (block 1010). The servers are also checked to determine if there is any missing software that is required by the process software in block 1010.

A determination is made if the version numbers match the version numbers of OS, applications and NOS that have been tested with the process software (block 1012). If all of the versions match and there is no missing required software the integration continues in query block 1006.

If one or more of the version numbers do not match, then the unmatched versions are updated on the server or servers with the correct versions (block 1014). Additionally, if there is missing required software, then it is updated on the server or servers in the step shown in block 1014. The server integration is completed by installing the process software (block 1016).

The step shown in query block 1006, which follows either the steps shown in block 1004, 1012 or 1016 determines if there are any programs of the process software that will execute on the clients. If no process software programs execute on the clients the integration proceeds to terminator block 1018 and exits. If this not the case, then the client addresses are identified as shown in block 1020.

The clients are checked to see if they contain software that includes the operating system (OS), applications, and network operating systems (NOS), together with their version numbers, which have been tested with the process software (block 1022). The clients are also checked to determine if there is any missing software that is required by the process software in the step described by block 1022.

A determination is made is the version numbers match the version numbers of OS, applications and NOS that have been tested with the process software (query block 1024). If all of the versions match and there is no missing required software, then the integration proceeds to terminator block 1018 and exits.

If one or more of the version numbers do not match, then the unmatched versions are updated on the clients with the correct versions (block 1026). In addition, if there is missing required software then it is updated on the clients (also block 1026). The client integration is completed by installing the process software on the clients (block 1028). The integration proceeds to terminator block 1018 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 11A:
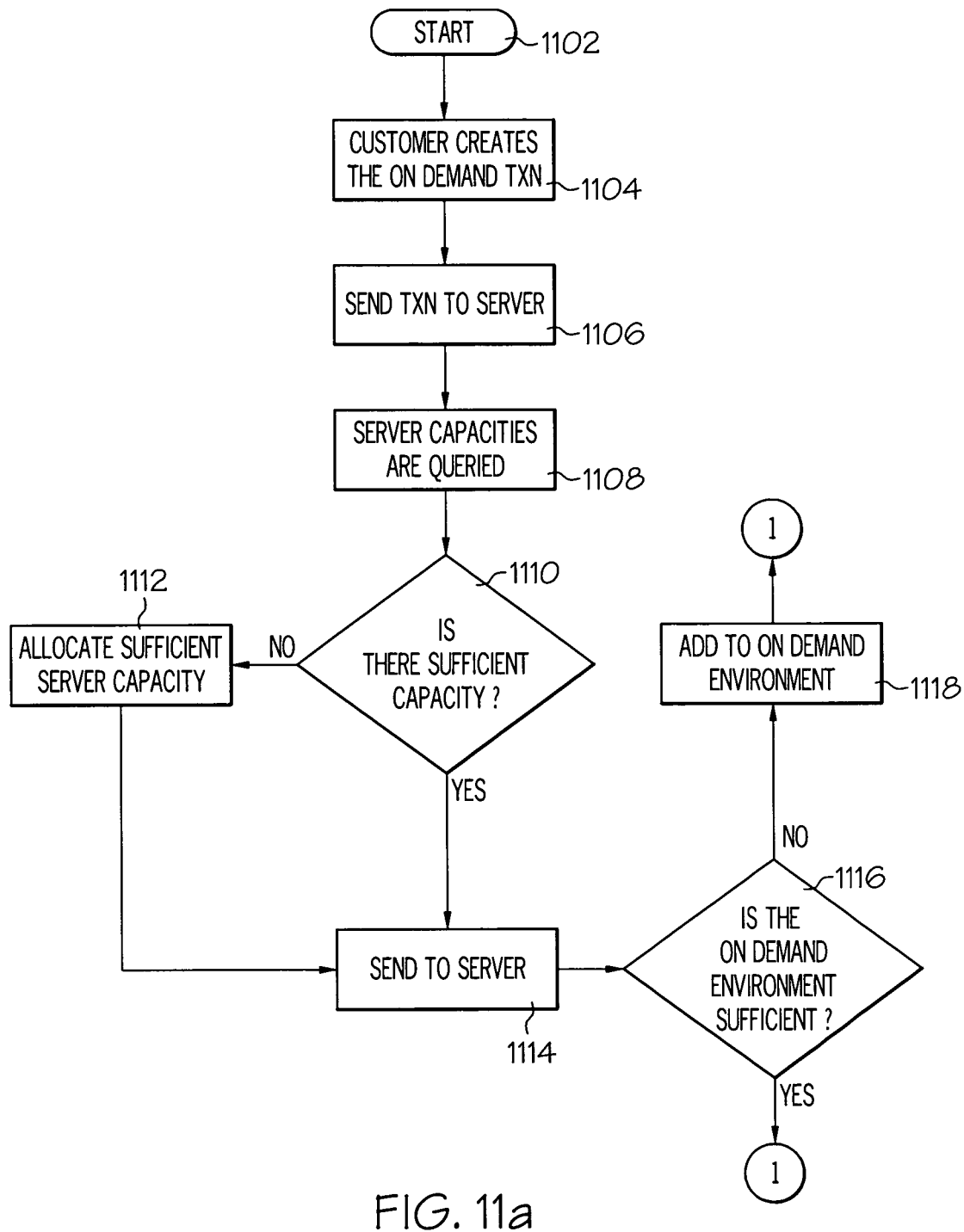
FIGS. 11a-b show a flow-chart showing steps taken to execute the steps shown and described in FIGS. 1-5 using an on-demand service provider.
Figure 11B:
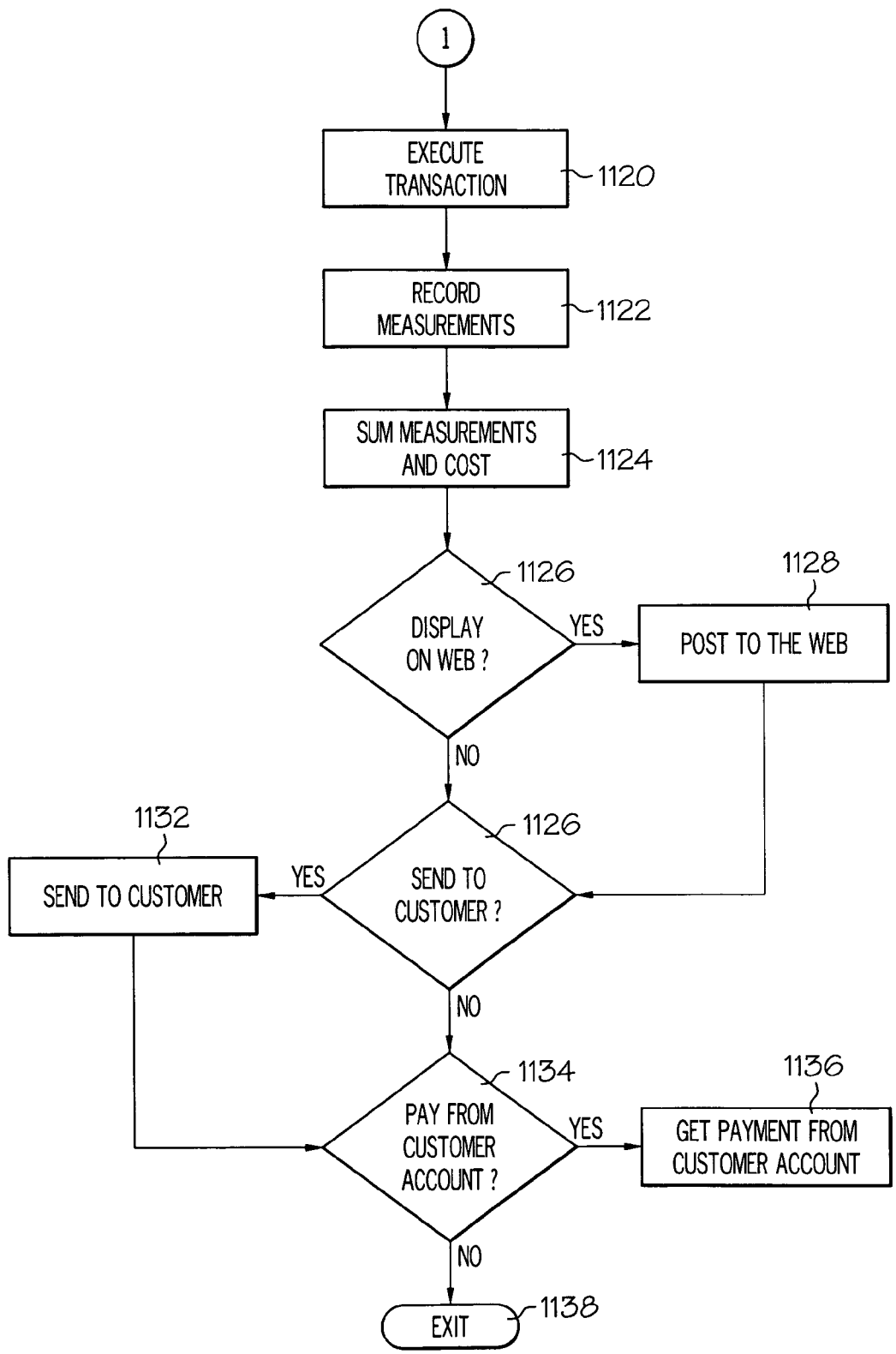

With reference now to FIG. 11, initiator block 1102 begins the On Demand process. A transaction is created than contains the unique customer identification, the requested service type and any service parameters that further, specify the type of service (block 1104). The transaction is then sent to the main server (block 1106). In an On Demand environment the main server can initially be the only server, then as capacity is consumed other servers are added to the On Demand environment.

The server central processing unit (CPU) capacities in the On Demand environment are queried (block 1108). The CPU requirement of the transaction is estimated, then the servers available CPU capacity in the On Demand environment are compared to the transaction CPU requirement to see if there is sufficient CPU available capacity in any server to process the transaction (query block 1110). If there is not sufficient server CPU available capacity, then additional server CPU capacity is allocated to process the transaction (block 1112). If there was already sufficient Available CPU capacity then the transaction is sent to a selected server (block 1114).

Before executing the transaction, a check is made of the remaining On Demand environment to determine if the environment has sufficient available capacity for processing the transaction. This environment capacity consists of such things as but not limited to network bandwidth, processor memory, storage etc. (block 1116). If there is not sufficient available capacity, then capacity will be added to the On Demand environment (block 1118). Next the required software to process the transaction is accessed, loaded into memory, then the transaction is executed (block 1120).

The usage measurements are recorded (block 1122). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1124).

If the customer has requested that the On Demand costs be posted to a web site (query block 1126), then they are posted (block 1128). If the customer has requested that the On Demand costs be sent via e-mail to a customer address (query block 1130), then these costs are sent to the customer (block 1132). If the customer has requested that the On Demand costs be paid directly from a customer account (query block 1134), then payment is received directly from the customer account (block 1136). The On Demand process is then exited at terminator block 1138.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
   an Entitlement Broker Service (EBS) receiving, from an External Authentication Application (EAA), an entitlement credential identifying one or more entitled users who are entitled to access a protected computer resource, wherein the protected computer resource is available only to entitled users, and wherein access to the protected computer resource has been requested of an External Client Application (ECA) by a requesting user;
   the EBS sending a request to an Entitlement Source (ES) for entitlement information for the requesting user based on the entitlement credential for the requesting user;
   the EBS receiving, from the ES, the entitlement information for the requesting user;
   the EBS transmitting the entitlement information, for the requesting user, to the ECA, wherein the EBS brokers the entitlement information from the ES to the ECA such that the requesting user is able to access the protected computer resource according to information in the entitlement information; and
   the EBS filtering entitlement identifiers by using an entitlement wildcard, wherein the entitlement wildcard permits the requesting user to access the protected computer resource if the requesting user has only an incomplete portion of entitlement criteria required by the protected computer resource for access to the protected computer resource.

2. The computer-implementable method of claim 1, further comprising:
   the EBS determining if the requesting user is entitled to receive access to the protected computer resource through the use of an Adjunct User Interface Application (AUIA), wherein the AUIA is capable of directing the requesting user to additional help resources to enable the requesting user in obtaining requisite entitlement information needed to access the protected computer resource.

3. The computer-implementable method of claim 1, further comprising:
   the EBS storing a result of a previous entitlement query;
   the EBS receiving a subsequent request for entitlement information needed to access the protected computer resource; and
   in response to the requesting user having been previously granted access to the protected computer resource according to the stored result from the previous entitlement query, the EBS transmitting the entitlement information, for the requesting user, to the ECA to authorize access, for the requesting user, to the protected computer resource.

4. The computer-implementable method of claim 1, further comprising:
permitting access to the protected computer resource by the requesting user.

5. The computer-implementable method of claim 1, further comprising:
storing a result of a previous entitlement query in an Entitlement Connector (EC), wherein the EC determines which user credentials are required to identify and authenticate the requesting user as an authorized user of the protected computer resource;
the EBS receiving a subsequent request for entitlement information needed to access the protected computer resource; and
in response to the requesting user not being currently connected to the protected computer resource but having been previously granted access to the protected computer resource according to the stored result from the previous entitlement query, transmitting the entitlement information, for the requesting user, from the EC to the ECA to authorize access, for the requesting user, to the protected computer resource.

6. A system comprising:
a processor;
a data bus coupled to the processor;
a memory coupled to the data bus; and
a computer-usable medium embodying computer program code, the computer program code comprising instructions executable by the processor and configured for:
an Entitlement Broker Service (EBS) receiving, from an External Authentication Application (EAA), an entitlement credential identifying one or more entitled users who are entitled to access a protected computer resource, wherein the protected computer resource is available only to entitled users, and wherein access to the protected computer resource has been requested of an External Client Application (ECA) by a requesting user;
the EBS sending a request to an Entitlement Source (ES) for entitlement information for the requesting user based on the entitlement credential for the requesting user;
the EBS receiving, from the ES, the entitlement information for the requesting user;
the EBS transmitting the entitlement information, for the requesting user, to the ECA, wherein the EBS brokers the entitlement information from the ES to the ECA such that the requesting user is able to access the protected computer resource according to information in the entitlement information; and
filtering, at the EBS, entitlement identifiers by using an entitlement wildcard, wherein the entitlement wildcard permits the requesting user to access the protected computer resource if the requesting user has only an incomplete portion of entitlement criteria required by the protected computer resource for access to the protected computer resource.

7. The system of claim 6, wherein the instructions are further configured to:
determine at the EBS if the requesting user is entitled to receive access to the protected computer resource through the use of an Adjunct User Interface Application (AUIA), wherein the AUIA is capable of directing the requesting user to additional help resources to enable the requesting user in obtaining requisite entitlement information needed to access the protected computer resource.

8. The system of claim 6, wherein the instructions are further configured to:
store, in the EBS, a result of a previous entitlement query;
receive a subsequent request for entitlement information needed to access the protected computer resource; and
in response to the requesting user having been previously granted access to the protected computer resource according to the stored result from the previous entitlement query, transmit the entitlement information, for the requesting user, from the EBS to the ECA to authorize access, for the requesting user, to the protected computer resource.

9. The system of claim 6, wherein the instructions are further configured to:
permit access to the protected computer resource by the requesting user.

10. The system of claim 6, wherein the instructions are further configured to:
store a result of a previous entitlement query in an Entitlement Connector (EC), wherein the EC determines which user credentials are required to identify and authenticate the requesting user as an authorized user of the protected computer resource;
receive, at the EBS, a subsequent request for entitlement information needed to access the protected computer resource; and
in response to the requesting user not being currently connected to the protected computer resource but having been previously granted access to the protected computer resource according to the stored result from the previous entitlement query, transmit the entitlement information, for the requesting user, from the EC to the ECA to authorize access, for the requesting user, to the protected computer resource.

11. A non-transitory computer storage medium embodying computer program code, the computer program code comprising computer executable instructions configured for:
an Entitlement Broker Service (EBS) receiving, from an External Authentication Application (EAA), an entitlement credential identifying one or more entitled users who are entitled to access a protected computer resource, wherein the protected computer resource is available only to entitled users, and wherein access to the protected computer resource has been requested of an External Client Application (ECA) by a requesting user;
the EBS sending a request to an Entitlement Source (ES) for entitlement information for the requesting user based on the entitlement credential for the requesting user;
the EBS receiving, from the ES, the entitlement information for the requesting user; and the EBS transmitting the entitlement information, for the requesting user, to the ECA, wherein the EBS brokers the entitlement information from the ES to the ECA such that the requesting user is able to access the protected computer resource according to information in the entitlement information: and
filtering, at the EBS, entitlement identifiers by using an entitlement wildcard, wherein the entitlement wildcard permits the requesting user to access the protected computer resource if the requesting user has only an incomplete portion of entitlement criteria required by the protected computer resource for access to the protected computer resource.

12. The non-transitory computer storage medium of claim 11, wherein the embodied computer program code further comprises computer executable instructions configured to:
  determine at the EBS if the requesting user is entitled to receive access to the protected computer resource through the use of an Adjunct User Interface Application (AUIA), wherein the AUIA is capable of directing the requesting user to additional help resources to enable the requesting user in obtaining requisite entitlement information needed to access the protected computer resource.

13. The tangible computer storage medium of claim 11, wherein the embodied computer program code further comprises computer executable instructions configured to:
  store, in the EBS, a result of a previous entitlement query;
  receive a subsequent request for entitlement information needed to access the protected computer resource; and
  in response to the requesting user having been previously granted access to the protected computer resource according to the stored result from the previous entitlement query, transmit the entitlement information, for the requesting user, from the EBS to the ECA to authorize access, for the requesting user, to the protected computer resource.

14. The non-transitory computer storage medium of claim 11, wherein the embodied computer program code further comprises computer executable instructions configured to:
  permit access to the protected computer resource by the requesting user.

15. The non-transitory computer storage medium of claim 11, wherein the embodied computer program code further comprises computer executable instructions configured to:
  store a result of a previous entitlement query in an Entitlement Connector (EC), wherein the EC determines which user credentials are required to identify and authenticate the requesting user as an authorized user of the protected computer resource;
  receive, at the EBS, a subsequent request for entitlement information needed to access the protected computer resource; and
  in response to the requesting user not being currently connected to the protected computer resource but having been previously granted access to the protected computer resource according to the stored result from the previous entitlement query, transmit the entitlement information, for the requesting user, from the EC to the ECA to authorize access, for the requesting user, to the protected computer resource.

16. The non-transitory computer storage medium of claim 11, wherein the computer executable instructions are deployed to a client computer from a server at a remote location.

17. The non-transitory computer storage medium of claim 11, wherein the computer executable instructions are provided by a service provider to a customer in an on-demand basis.

\* \* \* \* \*